United States Patent Office 3,806,403
Patented Apr. 23, 1974

3,806,403
PROCESS FOR TREATING BLACK LIQUOR TO PRECIPITATE ORGANIC MATERIALS THEREFROM
Carl S. Ferguson, Stratham, N.H., assignor to Nyanza, Inc., Lawrence, Mass.
No Drawing. Filed Mar. 27, 1972, Ser. No. 238,370
Int. Cl. D21c *11/04*
U.S. Cl. 162—16
14 Claims

ABSTRACT OF THE DISCLOSURE

A novel process for treating black liquor of the kind produced as a by-product in the sulfate process for making kraft paper and, also, novel products produced by the treating process. The process comprises using sodium bisulfate or the like to precipitate organic materials from the liquor under conditions such as to avoid any substantial decomposition of the organic materials and, in the most advantageous embodiments of the invention, using urea-formaldehyde, or other urea-aldehyde reactants, as means to increase the efficiency of the precipitation and make the solid product more beneficial as a growth promoting agricultural product. The treated black liquor, after removal of the precipitated materials, is suitable for recycle to the pulp-making plant.

BACKGROUND OF THE INVENTION

For many years, the paper industry has been confronted with the serious problem of disposing of wastes from pulp production for paper-making processes with as little detrimental effect on the environment as possible.

A very large amount of effort has been expended on research, development and installation of treating facilities to deal with this problem. At present, the most common way of disposing of sulfate process black liquor is to concentrate it, typically from 15% to 55% solids, and then burn it by spraying it into a furnace. This process is costly in terms of consumed energy and is also a source of atmospheric pollutants which are high in sulfur compounds.

Precipitation processes have been suggested by a number of inventors as a means to improve handling of waste liquors from paper process. Most of these processes retain the use of a burning step which destroys any organic chemicals therein. Most of these precipitation type processes relate to the treatment of sulfate waste liquors and most such processes involve the acidification of the waste liquor with consequent destruction by oxidation of some of its organic values. For example, Bradley in U.S. Pat. 1,637,515 teaches a precipitation process employing niter cake for acidifying the liquor. Nitchsh, in U.S. Pat. 1,684,-712, and Richter, in U.S Pat. 1,859,888, teach similar processes.

Moreover, it is old in the art to teach the use of whatever organic values may be recovered from paper waste liquids as fertilizers. Good examples of this art are disclosed in U.S. Pat. 2,697,659 to MacIntire and U.S. Pat. 3,244,505 to Adolphson.

The black liquor waste of a sulfate process generally contains about 15% of solids. The organic solids in the waste liquor are approximately equal in weight of the pulp produced by the paper mill. A mill with an output of three hundred tons per day of pulp will have an enormous quantity of waste liquor which must be disposed of without contaminating the environment.

None of the above procedures is effective and economically satisfactory for the sharp separation by precipitation of organic values from sulfate process black liquor. The economic treatment of such black liquor and the recovery of its organic values has heretofore not been a commercially useful procedure.

SUMMARY OF THE INVENTION

It is an object of the invention to provide an improved process for treating black liquor of the type obtained as a waste product in the sulfate process for making kraft paper.

Another object of the invention is to provide such a process whereby the organic matter in such waste liquor can be efficiently and conveniently recovered in a convenient physical form for use as a plant and root growth promoter, soil conditioner, or the like.

A further object of the invention is to provide a process for incorporating nitrogen into the aforesaid organic matter in a form which is stable and particularly available for slow release when the precipitated product is used as a growth promoter.

Another object of the invention is to provide a process wherein the pH of the process is maintained at about neutral to avoid decomposition and loss both of organic components to be separated from the black liquor and of inorganic pulping chemicals, such as sulfides and carbonates, remaining in the filtrate which is later to be recycled. recycled.

Another object of the invention is to achieve the above objectives while keeping the inorganic values of the waste liquor solution in a form which allows it to be recycled with a minimum of reprocessing.

Still another object of the invention is to provide an improved organic growth promoter as produced by the process of the invention.

Other objects of the invention will be obvious to those skilled in the art on reading the instant application.

The above objectives have been substantially achieved by a process wherein the black liquor from a process for making kraft paper is treated by adding sodium bisulfate to the liquor at a pH such as to avoid decomposition of the black liquor's organic materials under acid conditions, for example a pH of 7 or above, and thereby achieving an excellent separation of organic materials as a precipitate and leaving a supernatant liquid bearing inorganic solutes and which may be recycled, with a minimum of post-precipitation treatment, to the pulp-making operations.

This process provides the first practical means of salvaging the organic components of black liquor for commercial use without contaminating these components with the inorganic chemicals of the black liquor.

Although the above process can be carried out at ambient temperatures, for example in the range of 0° C. to 100° C., it is advantageous that the sulphate process waste liquid be treated at a processing temperature of about 40° C. to 65° C. in order to achieve the largest and the most rapidly filterable precipitate.

Another particularly advantageous embodiment of the invention is to react some urea and formaldehyde, or other aldehyde, in a portion of the sodium bisulfate solution before it is used in the precipitation process. The resultant sodium bisulfate solution has an excellent flocculating or clarifying action on the waste solution being treated. Moreover, the urea-formaldehyde reaction product becomes intimately associated with the precipitated product, and thereby provides a suitably slow release, nitrogen-bearing nutrient for that product when it is used as a soil conditioner or growth promoter.

A particularly desirable form of aldehyde for use in the invention is glyoxal. It is believed that the glyoxal reacts with the organic solids of the black liquor as well as the urea and thereby achieves a chemical bonding of the urea-nitrogen to the organic precipitate.

Other precipitating chemicals may be used besides sodium bisulfate. Some of these are recognized as clear equivalents by those skilled in the art, for example potassium bisulfate. Ammonium sulfate and potassium superphosphate solutions can also be used with some success. Nevertheless, the direct use of sodium bisulfate appears to give the best results with respect to both achieving a desirable precipitate and adding desirable chemicals to the solution for recycle.

It is also possible and desirable to add trace elements of the type desirably present in agricultural soil to the product which make it more suitable for agricultural use. Most advantageously, this is done by adding the material as a sulfate, i.e. as ferrous sulfate, manganous sulfate, etc., as may be desired to achieve the desirable metal balance. Zinc and copper are other metal elements often required in trace amounts for desirable plant growth. These trace elements are preferably added directly to the black liquor before addition of the sodium bisulfate to ensure their incorporation as stable organic metal chelates, rather than as inorganic salts which could be capable of loss in, and subsequent contamination of, the filtrate.

ILLUSTRATIVE EMBODIMENT OF THE INVENTION

In order to point out more fully the nature of the present invention, the following working example is given as an illustrative embodiment of the present process and products produced thereby.

Example 1

In the following example, the black liquor is maintained at about 50° C. and the processing liquids, all aqueous solutions, have the following relative volumes:

| | Parts by volume |
|---|---|
| Black liquor (kraft sulfate process, adjusted to about 15% solids) | 450 |
| Ferrous sulfate ($FeSO_4 \cdot 7H_2O$) solution (one lb./gallon) | 54 |
| Urea solution (one lb./gallon) | 54 |
| Formaldehyde solution (37% by weight) | 9 |
| Sodium bisulfate solution (two lbs./gallon) | 100 |

The black liquor was received directly from the pulp-making system and the ferrous sulfate solution was added directly thereto with good agitation.

The urea and formaldehyde solutions were mixed together. The formaldehyde is present in a slight excess to assure the completion of the reaction of urea and formaldehyde. Then about 45 gallons of the sodium bisulfate solution were added to the urea-formaldehyde mixture. The resulting mixture was agitated gently for fifteen minutes. A copious white precipitate forms during this period.

This precipitate-containing mixture is added to the black liquor with good agitation.

Next the rest of the bisulfate solution was added in increments. The exact amount added is determined with reference to the pH of the resulting mixture. The pH should be lowered to the pH range of 7.0 to 7.5. Care should be taken to avoid any significant or prolonged reduction of pH into the acidic region.

Other criteria which may be used to determine when the pH is too low are evolution of easily detected hydrogen sulfide and foam formation caused by gas evolution.

The kraft liquor treated as described is agitated for ten to fifteen minutes and then filtered and washed twice with water before being dried at 180° F. and comminuted to a fine, granular consistency. The yield of such product was about 291 pounds.

This dry solid product of the invention is only slightly soluble in water. This characteristic is believed to enhance its release characteristics when it is employed as a plant nutrient. The product is, however, soluble in ammonium hydroxide solution and dilute potassium hydroxide and other such bases and, therefore can be marketed in liquid form. When such basic solutions are stored for prolonged periods, the addition of a preservative and solubilizer, such as n-propanol, will serve to increase their stability.

The product of the invention as described in Example 1 has been tested successfuly when incorporated about the roots of such plants as rose bushes and tomato plants. A product, substantially the same as that described in Example 1, but wherein glyoxal was used instead of formaldehyde, performed exceptionally well when used to promote the growth of sunflower plants.

It is suggested that the black liquor derived powder be incorporated in soil for such uses in the range of 2% to 20% by weight with the soil, or from 100 to 1000 pounds per acre, depending on the crop, soil, or other conditions. In the case of commercially grown tomatoes on sandy soils, for example, 400 pounds of the material were applied to an acre, pre-mixed with the regular fertilizer normally used.

Another utility of the product of the invention is to incorporate it into fertilizer compositions, for example in quantities of 2% to 50% or more, based on the weight of the fertilizer. This utility requires a mixing step for which the product of the invention is ideally suited because of its free-flowing condition. Such addition to dry fertilizers which are soluble and easily leached from the soil further tends to coat the granules of such fertilizers with the less soluble material and thereby render the fertilizers more resistant to leaching and thus increasing their effective life.

Although the filtrate from the treated black liquor normally requires only recausticization before recycling, it is often desirable to reconcentrate it with lime and also to remove color bodies therefrom by adding small amounts of aqueous aluminum sulfate solutions following the liming operation. This treatment causes a double precipitation of calcium sulfate and aluminum hydroxide, which are effective in clarification without contamination of the solution to be recycled. The liquid is then either refiltered or clarified by centrifugal action before being recycled to the pulping operation.

It is, of course, to be understood that the foregoing example is intended to be illustrative and that numerous changes can be made in the reactants, proportions, and conditions set forth therein without departing from the spirit of the invention as defined in the appended claims.

What is claimed is:

1. A process for treating the waste black liquor of the type produced during the manufacture of kraft paper, said process comprising the steps of:
    adding sodium bisulfate to said liquor to effect the precipitation of organic materials from said liquor at a pH of about 7.5 or below to leave a supernatant liquid;
    but stopping the addition of said bisulfate to said liquor at a pH of about 7 or above;
    removing the precipitate from the liquid, and recycling the liquid to a kraft paper manufacturing process.

2. A process as defined in claim 1 comprising an additional step wherein:
    said liquid is recycled to a kraft pulp-making process of the sulfate type.

3. A process as defined in claim 2, wherein:
    said liquid is concentrated and causticized before being recycled.

4. A process as defined in claim 1, wherein:
    a urea-bearing compound is utilized as a flocculating agent during said precipitation step.

5. A process as defined in claim 4, wherein:
    said urea-bearing compound is a urea-aldehyde compound, reacted in a sodium bisulfate solution.

6. A process as defined in claim 5, wherein:
    said aldehyde is glyoxal.

7. A process as defined in claim 1, wherein:
    the quantity of sodium bisulfate used per pound of organic solids in said black liquor is from about 60% to 90% by weight.

8. A process as defined in claim 3, wherein:
the quantity of sodium bisulfate used per pound of organic solids in said black liquor is from about 60% to 90% by weight.

9. A process as defined in claim 4, wherein:
the quantity of sodium bisulfate used per pound of organic solids in said black liquor is from about 60% to 90% by weight.

10. A process as defined in claim 4, wherein:
the quantity of urea in said flocculating agent is from about 4% to 22% by weight, based on the weight of organic solids in said black liquor.

11. A process as defined in claim 10, wherein:
the quantity of sodium bisulfate used per pound of organic solids in said black liquor is from about 60% to 90% by weight.

12. A process as defined in claim 5, wherein:
the precipitating step is carried out between 40° C. and 60° C.

13. A process as defined in claim 12, wherein:
the quantity of urea in said flocculating agent is from about 4% to 22% by weight, based on the weight of organic solids in said black liquor.

14. A process as defined in claim 6, wherein:
the precipitating step is carried out between 40° C. and 60° C.

References Cited

UNITED STATES PATENTS

| | | | |
|---|---|---|---|
| 1,684,712 | 9/1928 | Nitsche | 71—25 |
| 1,637,515 | 8/1927 | Bradley et al. | 162—16 |
| 1,859,888 | 5/1932 | Richter | 162—16 |

FOREIGN PATENTS

| | | | |
|---|---|---|---|
| 548,280 | 1942 | Great Britain | 162—16 |

S. LEON BASHORE, Primary Examiner

H. D'ANDREA, JR., Assistant Examiner

U.S. Cl. X.R.

162—29, 45; 210—52